United States Patent Office 3,097,212
Patented July 9, 1963

3,097,212
N-METHYL-2-[2'-(ALPHA-METHYL-PARA-HALO-BENZHYDRYLOXY)-ETHYL]PYRROLIDINE
Ernst Jucker, Binningen, Basel-Land, and Anton Ebnöther, Basel, Switzerland, assignors to Sandoz A.G., Basel, Switzerland, a Swiss firm
No Drawing. Filed Jan. 9, 1961, Ser. No. 81,241
Claims priority, application Switzerland Jan. 19, 1960
2 Claims. (Cl. 260—326.5)

The present invention relates to novel pyrrolidine and piperidine ethers, their acid addition salts and to the preparation thereof.

These pyrrolidine and piperidine ethers have the Formula I,

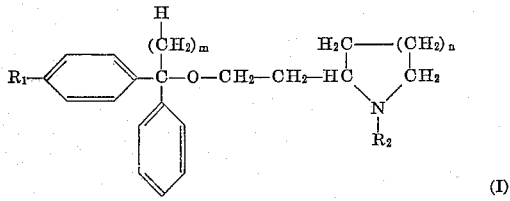

wherein $R_1$ is a radical selected from the group consisting of hydrogen, halogen, lower alkyl containing from 1 to 4 carbon atoms and lower alkoxy containing from 1 to 4 carbon atoms, $R_2$ is a radical selected from the group consisting of lower alkyl containing from 1 to 4 carbon atoms, $m$ is an integer from 0, 1, 2 and 3 and $n$ is an integer from 1 to 2, with the proviso that $m+n$ must be at least 2.

The aforesaid pyrrolidine and piperidine ethers of Formula I are prepared, according to this invention, by reacting a diphenyl-methyl compound of the Formula II,

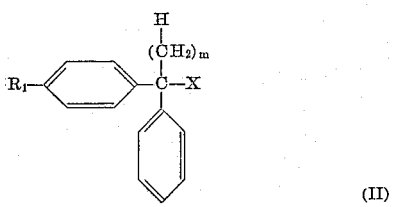

wherein $R_1$ and $m$ have the above significance, with a saturated mononitrogen heterocyclic 5-6 membered ring compound of the Formula III,

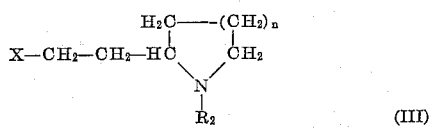

wherein $R_2$ and $n$ have the above identified significance and wherein the X radical in both of Formulae II and III represents dissimilar radicals, one X being hydroxyl and the other X being halogen selected from the group consisting of bromine or chlorine; the resulting compounds may be converted to their acid addition salts.

One method of carrying out the process of the present invention may be effected as follows: 1-methyl-piperidyl-(2)-ethanol is condensed with p-chlorophenyl-phenyl-chloromethane in the presence of a hydrogen halide binding agent, for example anhydrous sodium carbonate, at an elevated temperature for several hours. Subsequently the reaction mixture is mixed with an inert organic solvent, for example benzene, inorganic salts are removed by filtration and the filtrate evaporated in a vacuum.

Compounds of the Formula I may likewise be obtained by reacting a compound of the general Formula II wherein X represents a hydroxy group, with a compound of the general Formula III, wherein X represents a bromine or chlorine atom, in an inert solvent, for example benzene, in the presence of sodium amide. In order to complete the reaction, heating to the boil is effected for several hours and, subsequently, evaporation in a vacuum of the filtrate resulting from filtering off the inorganic salts. The end product of the general Formula I is isolated from the residue by fractional distillation in a high vacuum. The free bases are readily converted into acid addition salts in conventional manner.

The acid addition salts of the novel compounds under Formula I are stable crystalline salts which are obtained by reacting the basic compound of Formula I with pharmacologically acceptable inorganic or organic acids such as hydrochloric acid, hydrobromic acid, hydroiodic acid, sulfuric acid, phosphoric acid, nitric acid, benzoic acid, benzene sulfonic acid, naphthalene sulfonic acid, naphthalene 1,5-disulfonic acid, salicylic acid, glycolic acid, acetic acid, succinic acid, mandelic acid, maleic acid, fumaric acid, nicotinic acid, tartaric acid, levulinic acid, stearic acid, myristic acid, palmitic acid, citric acid, isocitric acid, glutaric acid, malic acid, pimelic acid, lactic acid and the like.

The compounds of the Formula I above have highly interesting pharmacodynamic properties which properties are useful in the field of pharmaceuticals. The compounds illustrated hereinafter in the examples have a relatively low toxicity, a pronounced histamine inhibiting effect and a weak acetylcholine inhibiting (atropine like) effect. These properties are those required of antihistamines. The compounds of the present invention are therefore useful either as pharmaceutical compounds themselves or may be used as intermediate products for the manufacture of pharmaceuticals.

The following examples illustrate the invention without, however, limiting it; the temperatures are all stated in degrees centigrade, and the melting and boiling points are uncorrected.

*Example 1.—N-Methyl-2-(2'-p-Chloro-Benzhydryloxy-Ethyl)-Piperidine*

11.9 g. of p-chlorophenyl-phenylchloromethane, 7.2 g. of 1-methyl-piperidyl-(2)-ethanol and 5.5 g. of anhydrous sodium carbonate are heated while stirring to 125° for 8 hours. Subsequently some benzene is added to the reaction mixture which has been cooled somewhat, the inorganic salts are filtered off and the filtrate is evaporated in a vacuum. The residue is distilled in a vacuum, whereby N-methyl-2-(2'-p-chloro-benzhydryloxy-ethyl)-piperidine distils over at 0.02 mm. of Hg and at a bath temperature of 180–200° in the form of a pale yellow oil.

*Example 2.—N-Methyl-2-(2'-Benzhydryloxy)-Ethyl)-Piperidine*

24.7 g. of benzhydryl bromide, 14.3 g. of N-methyl-piperidyl-(2)-ethanol and 10.6 g. of anhydrous sodium carbonate are heated to 125° for 8 hours while stirring. Subsequently about 100 cc. of benzene are added to the slightly cooled reaction mixture, the resulting inorganic salts are filtered off and then the filtrate is evaporated in a vacuum. The residue is fractionally distilled in a high vacuum, whereby N-methyl-2-(2'-benzhydryloxy-ethyl)-piperidine distils over at 162°/0.02 mm. Hg, $n_D^{21.5}=1.5538$.

The neutral naphthalene-1,5-disulphonate has a melting point of 211 to 213° after recrystallisation from methanol.

In manner analogous to that described above the following compounds are obtained from N-methyl-piperidyl- (2)-ethanol and a diphenyl-methyl halide of the Formula II:

| Example No. | Substance | B.P./mm. of Hg refractive index | Starting Material (Formula II) |
|---|---|---|---|
| 3 | N-Methyl-2-(2'-p-bromobenzhydryloxyethyl)-piperidine. | 181–183°/0.08 $n_D^{24}=1.5733$ | p-Bromophenyl-phenyl-chloromethane. |
| 4 | N-Methyl-2-(2'-p-fluorobenzhydryloxyethyl)-piperidine. | 149–151°/0.01 $n_D^{23}=1.5426$ | p-Fluorophenyl-phenyl-chloromethane. |
| 5 | N-Methyl-2-(2'-p-methylbenzhydryloxyethyl)-piperidine. | 175°/0.08 $n_D^{22.5}=1.5506$ | p-Methylphenyl-phenyl-bromomethane. |
| 6 | N-Methyl-2-(2'-p-methoxybenzhydryloxyethyl)-piperidine. | 180–181°/0.04 $n_D^{24}=1.5548$ | p-Methoxyphenyl-, phenyl-chloromethane. |

*Example 7.—N - Methyl - 2-[2'-(α-Methyl-Benzhydryloxy)-Ethyl]-Piperidine*

19.8 g. of α-methylbenzhydrol are added to a suspension of 4.7 g. of powdered sodium amide in 60 cc. of benzene, whereby the sodium salt is formed at once with slight heating. Subsequently 16.2 g. of N-methyl-piperidyl-(2)-ethyl chloride are added. The resulting solution is heated to the boil at reflux for 18 hours. Inorganic salts are filtered off and the filtrate is evaporated in a vacuum. The residue is fractionally distilled in a high vacuum, whereby N-methyl-2[2'-(α-methyl-benzhydryloxy)-ethyl]-piperidine distils over at 143°/0.01 mm. Hg, $n_D^{21}=1.5526$.

The neutral naphthalene-1,5-disulphonate has a melting point of 167–169° after recrystallisation from ethanol.

In manner analogous to that described above the following compounds are obtained from N-methyl-piperidyl-(2)-ethyl chloride and an α-methylbenzhydrol of the Formula II:

| Example No. | Substance | B.P./mm. of Hg refractive index | Starting Material (Formula II) |
|---|---|---|---|
| 8 | N-Methyl-2-[2'-(α-methyl-p-chloro-benzhydryloxy)-ethyl]-piperidine. | 173°/0.03 $n_D^{20}=1.5595$ | Methyl-p-chloro-phenyl-phenyl-carbinol. |
| 9 | N-Methyl-2-[2'-(α-methyl-p-bromo-benzhydryloxy)-ethyl]-piperidine. | 166°/0.01 $n_D^{23}=1.5689$ | Methyl-p-bromo-phenyl-phenyl-carbinol. |
| 10 | N-Methyl-2-[2'-(α-methyl-p-methyl-benzhydryloxy)-ethyl]-piperidine. | 150–152°/0.01 $n_D^{22}=1.5490$ | Methyl-p-tolyl-phenyl-carbinol. |

*Example 11.—N - Methyl - 2-[2'-(α-Methyl-Benzhydryloxy)-Ethyl]-Pyrrolidine*

9.9 g. of α-methylbenzhydrol are added to a suspension of 2.3 g. of powdered sodium amide in 30 cc. of benzene. Subsequently 7.4 g. of N-methyl-pyrrolidyl-(2)-ethyl chloride are added and the solution is heated to the boil at reflux for 20 hours. Then shaking is first effected with water and then four times each time with 25 cc. of 2 N hydrochloric acid. The acid extracts are made alkaline with potassium hydroxide solution while cooling strongly, and the precipitated oil is extracted with ether. After drying of the ethereal solution over potassium carbonate, the solvent is evaporated and the residue is fractionally distilled in a high vacuum, whereby N-methyl-2[2'-(α-methyl-benzhydryloxy)-ethyl]-pyrrolidine distils over at 143°/0.02 mm. Hg, $n_D^{22}=1.5510$.

The neutral naphthalene-1,5-disulphonate melts at 175 to 176° (decomposition) after crystallisation from ethanol.

In manner analogous to that described above the following compounds are obtained from N-methyl-pyrrolidyl-(2)-ethyl chloride and a diphenyl carbinol of the general Formula II:

| Example No. | Substance | B.P./mm. of Hg refractive index | Starting Material (Formula II) |
|---|---|---|---|
| 12 | N-Methyl-2-[2'-(α-methyl-p-chloro-benzhydryloxy)-ethyl]-pyrrolidine. | 154°/0.02 $n_D^{22}=1.5582$ | Methyl-p-chloro-phenyl-phenyl-carbinol. |
| 13 | N-Methyl-2-[2'-(α-methyl-p-bromo-benzhydryloxy)-ethyl]-pyrrolidine. | 162°/0.02 $n_D^{22}=1.5698$ | Methyl-p-bromo-phenyl-phenyl-carbinol. |
| 14 | N-Methyl-2-[2'-(α-methyl-p-methyl-benzhydryloxy)-ethyl]-pyrrolidine. | 152°/0.02 $n_D^{22}=1.5480$ | Methyl-p-tolyl-phenylcarbinol. |

In the foregoing examples compounds of Formula I are illustrated wherein $R_1$ is hydrogen, methyl, methoxy and halogen, but it is clear that $R_1$ may also be ethyl, propyl, butyl, ethoxy, propoxy and butoxy radicals.

Having thus disclosed the invention, what is claimed is:

1. N - methyl - 2-[2'-(α-methyl-p-chloro-benzhydryl-oxy)-ethyl]-pyrrolidine.

2. N - methyl - 2-[2'-(α-methyl-p-bromo-benzhydryl-oxy)-ethyl]-pyrrolidine.

References Cited in the file of this patent

UNITED STATES PATENTS

| 2,708,194 | Blicke | May 10, 1955 |
| 2,745,837 | Papa et al. | May 15, 1956 |
| 2,751,388 | Levy | June 19, 1956 |